(12) United States Patent
Penno et al.

(10) Patent No.: US 7,520,153 B2
(45) Date of Patent: Apr. 21, 2009

(54) BURSTING DISK AND METHOD FOR MANUFACTURING THE SAME

(75) Inventors: Bernhard Penno, Brilon (DE); Norbert Schluter, Brilon (DE)

(73) Assignee: Rembe GmbH, Brilon (DE)

( * ) Notice: Subject to any disclaimer, the term of this patent is extended or adjusted under 35 U.S.C. 154(b) by 0 days.

(21) Appl. No.: 11/747,023

(22) Filed: May 10, 2007

(65) Prior Publication Data

US 2007/0266757 A1    Nov. 22, 2007

(30) Foreign Application Priority Data

May 13, 2006    (DE) ........................ 10 2006 022 478

(51) Int. Cl.
*B21D 22/00*    (2006.01)
*B21D 39/08*    (2006.01)

(52) U.S. Cl. ............................................. 72/348; 72/57

(58) Field of Classification Search ............... 72/57–60, 72/347–349, 379.2
See application file for complete search history.

(56) References Cited

U.S. PATENT DOCUMENTS 4,105,167 A * 8/1978 Knox ....................... 242/390.2

2004/0189020 A1    9/2004  Krebill et al.

FOREIGN PATENT DOCUMENTS

DE    25 13 038    10/1975
GB    1 464 081    2/1977

* cited by examiner

*Primary Examiner*—Dana Ross
*Assistant Examiner*—Teresa Bonk
(74) *Attorney, Agent, or Firm*—Pauly, DeVries Smith & Deffner, L.L.C.

(57) ABSTRACT

A method for manufacturing a bursting disk from a sheet or foil is disclosed. The bursting disk has an edge for clamping the bursting disk in a clamping device and a middle region enclosed by the edge, with the following manufacturing steps: the sheet or foil is clamped with a first portion forming the future edge of the bursting disk, said first portion defining a second portion which corresponds to the future middle region of the bursting disk. A third region is defined, which is located within the second portion of the sheet or foil, a part of the second portion enclosing the third portion of the sheet or foil is clamped completely by means of a pair of clamping jaws or female dies, the sheet or foil is deformed for a first time in the third portion, the third portion being located within the second portion, which remains undeformed.

11 Claims, 1 Drawing Sheet

B

BURSTING DISK AND METHOD FOR MANUFACTURING THE SAME

PRIORITY

This application claims the benefit of German Application Serial No. 10 2006 022 478.7 entitled "Bursting Disk and Method for Manufacturing the same", filed May 13, 2006, which application is hereby incorporated by reference in its entirety.

BACKGROUND OF THE INVENTION

From the prior art, various bursting disks are known. An outline of bursting devices is provided, for instance, by the brochure "AD 2000-Merkblatt A1", which is issued by the "Arbeitsgemeinschaft Druckbehälter" (group working on pressure vessels). The brochure contains safety specifications applicable to bursting devices. According to the brochure, bursting devices comprise a bursting element and, if necessary, a clamping device, which accommodates the bursting element. In addition, various further elements such as cutting devices can form part of a bursting device.

However, a need remains for improved bursting disks and methods of making bursting disks.

SUMMARY OF THE INVENTION

This invention relates to a method for manufacturing a bursting disk from a sheet or foil, wherein the bursting disk has an edge for clamping the bursting disk into a clamping device and a middle region enclosed by the edge. This invention furthermore comprises a bursting disk.

The above summary of the present invention is not intended to describe each discussed embodiment of the present invention. This is the purpose of the figures and the detailed description that follows.

DRAWINGS

Figure 1A:
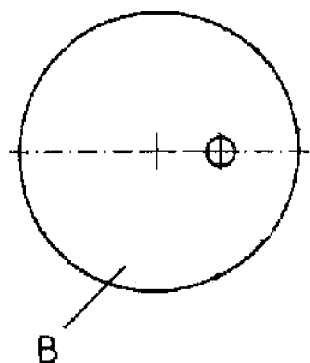
Figure 1B:
Figure 2A:
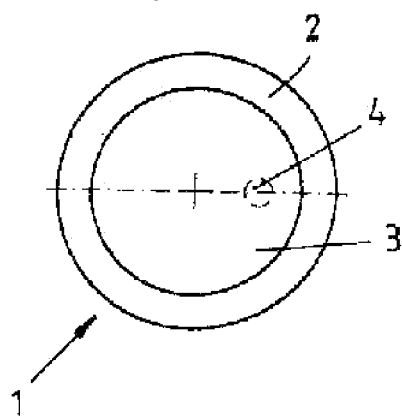
Figure 2B:
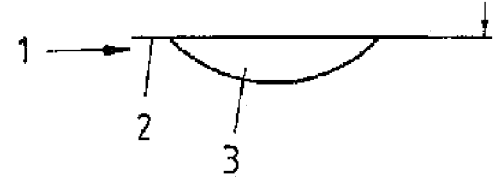

The invention may be more completely understood in connection with the following drawings, in which:

FIG. 1a shows a top view of a circular sheet or foil blank after a first step of the manufacturing method, FIG. 1b shows a side view of the circular sheet or foil blank as shown in FIG. 1a, FIG. 2a shows a top view of the bursting disk manufactured by the manufacturing method from the circular sheet or foil blank, and FIG. 2b shows a side view of the bursting disk as shown in FIG. 2a.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

This invention relates to a method for manufacturing a bursting disk from a sheet or foil, wherein the bursting disk has an edge for clamping the bursting disk into a clamping device and a middle region enclosed by the edge. This invention furthermore comprises a bursting disk.

From the prior art, various bursting disks are known. An outline of bursting devices is provided, for instance, by the brochure "AD 2000-Merkblatt A1", which is issued by the "Arbeitsgemeinschaft Druckbehälter" (group working on pressure vessels). The brochure contains safety specifications applicable to bursting devices. According to the brochure, bursting devices comprise a bursting element and, if necessary, a clamping device, which accommodates the bursting element. In addition, various further elements such as cutting devices can form part of a bursting device.

As bursting elements, there are used in particular different types of bursting disks. Bulged bursting disks and flat bursting disks are of particular importance. In the case of the bulged bursting disks, a distinction is made between concavely bulged bursting disks, which in the direction of pressure are shaped as a segment of a spherical diaphragm. Convex bursting disks, which are also referred to as reversible bursting disks, have a bulge against the direction of pressure. While the concavely bulged bursting disks will burst upon reaching a response pressure due to exceeding the fracture stress, the reversible bursting disks will fail upon reaching the response pressure due to exceeding the buckling strength of the ball segment. The bulge buckles and is inverted. In doing so, it strikes a cutting device or tears open the indentation, so that the disk is destroyed and its relief surface is exposed.

In the past, bursting disks or bursting devices with bursting disks were found to be reliable excess-pressure safety devices. However, there are problems to create reliably operating bursting disks for conduits with small clear cross-sections. Here, the problem consists in that the bursting disks must already burst at low pressures, which requires very thin bursting disks. The sheets or foils necessary for manufacturing such thin bursting disks are sensitive, however, both during processing and after manufacturing the bursting disk. Small damages or minor forces thus can lead to a change in the bursting behavior of such bursting disks. Moreover, in the case of bursting disks with very thin diaphragms, the pressure range, in which the bursting disk will respond, can be defined only very roughly. Experience has shown that the tolerances are very large.

The document US 2004/0189020 A1 discloses a bursting disk and a method for manufacturing the bursting disk, wherein during manufacture of the bursting disk a point in the middle region is produced, which due to plastic deformation has a different structure than the sheet surrounding the same. For this purpose, this point has been deformed twice, with the second deformation cancelling the first deformation in so far as the bursting disk has a middle region with a uniformly bulged surface.

The bursting disk with the point deformed twice has a smaller response region than a bursting disk without such point. However, the response region still is so large that a precise prediction of the response pressure cannot be made.

In view of the problems discussed above, it is the object underlying the invention to propose a method for manufacturing bursting disks, in which the response behavior can be predetermined more precisely.

In particular, the tolerance ranges should be reduced, so that bursting disks for smaller clear diameters can be manufactured from sheets or foils of greater thickness despite the small pressures.

According to the inventive method for manufacturing a bursting disk from a sheet or foil, a bursting disk is manufactured, which has an edge for clamping the bursting disk in a clamping device and a middle region enclosed by the edge. The edge is made from a first portion of the sheet or foil, whereas the middle region is made from a second portion.

Within the second region, a third portion is determined. A part of the second portion enclosing the third portion is clamped completely by means of a pair of clamping jaws or a pair of matrices. Subsequently, the sheet or foil is deformed for a first time in the third portion. In addition, the sheet or foil is deformed in the second portion. Furthermore, the sheet or foil is deformed one more time in the third portion, in order to cancel the result of the first deformation in this portion for the eyes of a viewer. By means of this further deformation, the third portion is again adapted to the surrounding region, whereby the shape, in particular a bulge of the surrounding region, is continued in the first portion.

In particular as a result of the first deformation of the third portion, which is enclosed by the clamped part of the second portion, an abrupt change in the structure of the sheet or foil occurs at the boundary of the third portion. During the further deformation of the third portion, these differences in structure, in particular the differences in terms of grain between the sheet or foil of the second portion and of the third portion, are maintained.

As a result of the deformation effected at least twice in the third portion of the sheet or foil, the shape of the first portion has not or at least not substantially been changed with respect to the surroundings. However, the structure of the sheet or foil in the first portion is changed such that a locally precisely defined defect is created, so that the bursting disk manufactured in this way will respond within a narrower range of tolerance. Therefore, the response pressure of the bursting disk can be defined more precisely. Due to this more precise definition of the response pressure, thicker sheets or foils can be used for the manufacture and safer handling of the bursting disks, which turns out to be advantageous in particular for manufacturing bursting disks for small clear diameters and lower bursting pressures.

On the other hand, the point at which the material of the bursting disk in accordance with the document US 2004/0189020 A1 is deformed twice, is not delimited precisely with respect to the surrounding region of the bursting disk. In particular the first deformation, as it can be seen for instance in FIGS. 4 and 13 of the document US 2004/0189020 A1, acts beyond the point of application of the deformation forces or beyond the third portion and, for instance due to the continued flow of material, also leads to structural changes in the regions adjoining this point. In contrast to what is shown in FIG. 11 of the document US 2004/0189020 A1, an abrupt change in the properties of the material cannot be achieved with the manufacturing method as described in this document. The first deformation according to the method described in the document US 2004/0189020 A1 is not restricted to the region in which the deformation forces are applied.

The first deformation according to the method of the invention, however, is restricted to the third portion, as clamping that part of the second portion which encloses the third portion prevents a deformation of the second portion. A continued flow of material of the sheet or foil from the second portion into the third portion is not possible or possible only in a narrow border region between the portions.

In a method of the invention, the volume of the sheet or foil in the third portion preferably is not changed by the first deformation of the third portion. The thickness of the material of the third portion of the sheet or foil preferably is changed, however, during the first deformation of the third portion, i.e. it is decreasing, while the thickness of the material in the surrounding second portion remains unchanged. During the first deformation of the third portion, the sheet or foil preferably is stretched in the third portion.

In accordance with the invention, the first deformation of the third portion can be effected before the deformation of the second portion. It is likewise conceivable that the deformation of the second portion is effected along with the further deformation of the third portion.

In a method of the invention, the first deformation of the third portion can be effected by pressing or deep-drawing, in particular by hydromechanical deep-drawing. The deformation of the second portion and/or the further deformation of the third portion can be effected by deep-drawing, in particular by hydromechanical deep-drawing. In principle, however, every known and suitable method for deforming sheets can be used for deforming the sheet or foil in the third portion or in the second portion.

The result of the first deformation of the third portion can be a bulge. The bulge can have the shape of a spherical cap. The result of the deformation of the second portion and/or the further deformation of the third portion likewise can be a bulge.

A bursting disk of the invention, which is manufactured by a method of the invention as described above, includes a third portion within the middle region, in which on the one hand the shape of the surrounding middle region is continued at least for the eyes of a viewer and in which on the other hand the structure of the sheet or foil is changed with respect to the surrounding middle region. The structure of the first portion for instance differs from the structure of the surrounding middle region by its grain, the structure of the material of the bursting disk changing abruptly at the transition from the third portion of the middle region to the surrounding middle region.

The third portion advantageously is located away from the center of the middle region by $1/3$ to $2/3$, preferably, however, by only $1/15$ of the distance from the center of the middle region to the edge.

The bursting disk can be bulged in the middle region. The edge preferably is ring-shaped, and the middle region is cap-shaped. The bursting disk can be a convexly bulged or a concavely bulged bursting disk.

A method of the invention for manufacturing a bursting disk in accordance with the invention, and a bursting disk of the invention, which is manufactured by this method, will now be described in detail with reference to the drawings.

As a starting material for manufacturing a bursting disk of the invention the circular sheet or foil blank B is used.

A distinction is made between a first portion of the circular sheet or foil blank B, which will form an edge of the bursting disk, a second portion of the circular sheet or foil blank B within the first portion, and a third portion 4 within the second portion.

In a first manufacturing step, a cap-shaped bulge is incorporated in the circular sheet or foil blank in the third portion at a distance of about 11/20 of the radius of the circular sheet or foil blank. For this purpose, that part of the second portion, which encloses the third portion, is firmly clamped so as to completely enclose the third portion, and preferably a deep-drawing tool is used, by means of which the circular sheet or foil blank is indented or deep-drawn in the third portion, whereby the circular sheet or foil blank as shown in FIG. 1*a* and 1*b* is obtained.

Proceeding from the deformed circular sheet or foil blank as shown in FIG. 1*a* or 1*b*, the second manufacturing step is performed. For this purpose, the circular sheet or foil blank is deformed one more time. In a second portion 3, a spherical cap is formed by deep-drawing. The resulting bulge is oriented towards the other side than the deformation in the first portion 2. Along with the deformation of the circular sheet or foil blank B in the second portion 3, the deformation in the third portion 4 is cancelled. The shape of the circular sheet or foil blank in the first portion 2 continues the shape of the surrounding second portion 3. The fact that a different deformation initially was present in the first portion 2, no longer is visible to the naked eye of the viewer by a different shape of the sheet or foil. The previous deformation can at best be recognized with measurement means, by means of discolorations of the surface of the sheet or foil or by means of structural examinations.

By means of this second manufacturing step, there is finally obtained the bursting disk 1 as it is shown in FIG. 2a and FIG. 2b. The bursting disk has a middle region 3 obtained by deformation of the second portion 3 including the third portion 4, which is surrounded by a ring-shaped edge 2, the first portion. The ring-shaped edge is required for clamping the bursting disk in clamping means, for instance between two flanges.

The third portion 4 deformed twice forms a deliberately produced defect within the middle region 3 of the bursting disk, in which defect the sheet or foil from which the bursting disk is made is changed in its structure. As a result of this change in structure, the bursting disk is weakened in this region such that it forms a predetermined breaking or rupturing point or a point of the bursting disk where the buckling strength is lowest and the reversal of the bursting disk has its origin. When the pressure is increased beyond a predetermined amount when using the bursting disk, the bursting disk starts to rupture at the point of the double deformation of the third portion 4 or starts to reverse when used as a convexly bulged bursting disk, i.e. as a reversible bursting disk.

It will be appreciated that, although the implementation of the invention described above is directed to a hard drive enclosure, the present device may be used with other electronic enclosures, and is not limited to hard drive enclosures. In addition, while the present invention has been described with reference to several particular implementations, those skilled in the art will recognize that many changes may be made hereto without departing from the spirit and scope of the present invention.

The invention claimed is:

1. A method for manufacturing a bursting disk from a sheet or foil, wherein the bursting disk has an edge for clamping the bursting disk in a clamping device and a middle region enclosed by the edge, with the following manufacturing steps:

the sheet or foil is clamped with a first portion forming the future edge of the bursting disk, said first portion defining a second portion which corresponds to the future middle region of the bursting disk, a third portion is defined, which is located within the second portion of the sheet or foil, a part of the second portion enclosing the third portion of the sheet or foil is clamped completely by means of a pair of clamping jaws or female dies, the sheet or foil is deformed for a first time in the third portion, the third portion being located within the second portion, which remains undeformed, the sheet or foil is deformed in the second portion, and the sheet or foil is deformed one more time in the third portion, in order to cancel the result of the first deformation in this portion for the eyes of a viewer.

2. The method as claimed in claim 1, wherein during the first deformation of the third portion no material of the sheet or foil continues to flow in from the surrounding second portion.

3. The method as claimed in claim 1, wherein as a result of the first deformation of the third portion, the volume of the sheet or foil is not changed in the third portion.

4. The method as claimed in claim 1, wherein the thickness of the material of the third portion of the sheet or foil decreases during the first deformation of the third portion, whereas the thickness of the material in the surrounding second portion remains unchanged.

5. The method as claimed in claim 1, wherein during the first deformation of the third portion the sheet or foil is stretched in the third portion.

6. The method as claimed in claim 1, wherein the first deformation of the third portion is effected before the deformation of the second portion.

7. The method as claimed in claim 1, wherein the deformation of the second portion is effected along with the further deformation of the third portion.

8. The method as claimed in claim 1, wherein the first deformation of the third portion is effected by indentation or deep-drawing, in particular by hydromechanical deep-drawing.

9. The method as claimed in claim 1, wherein the deformation of the second portion and/or the further deformation of the third portion is effected by deep-drawing, in particular by hydromechanical deep-drawing.

10. The method as claimed in claim 1, wherein the result of the first deformation of the third portion is a bulge.

11. The method as claimed in claim 1, wherein the result of the deformation of the second portion and/or the further deformation of the third portion is a bulge.

* * * * *